Jan. 31, 1928.
F. K. EASTMAN
DOORCHECK STRAP
Filed Sept. 28, 1926
1,657,528
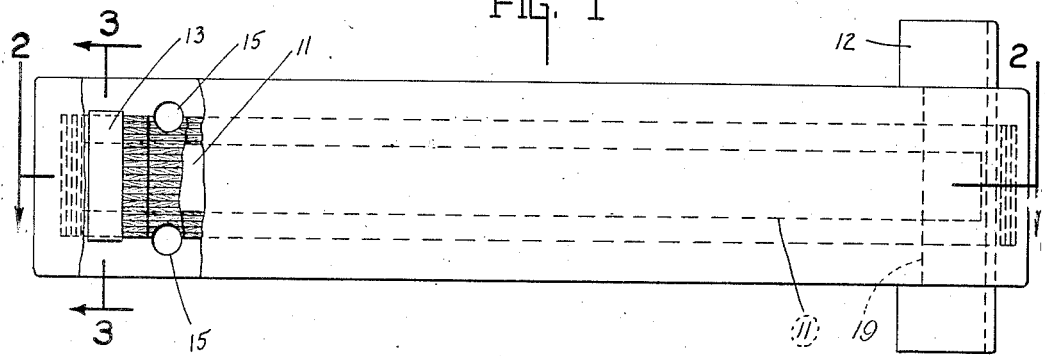
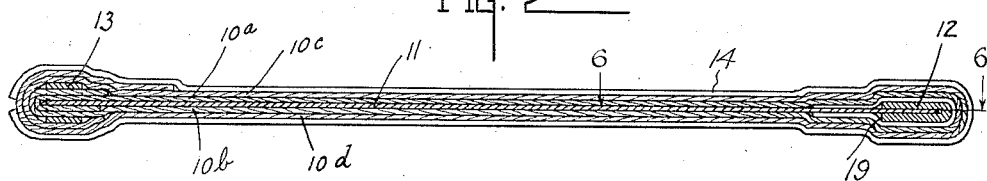
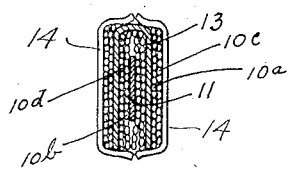 
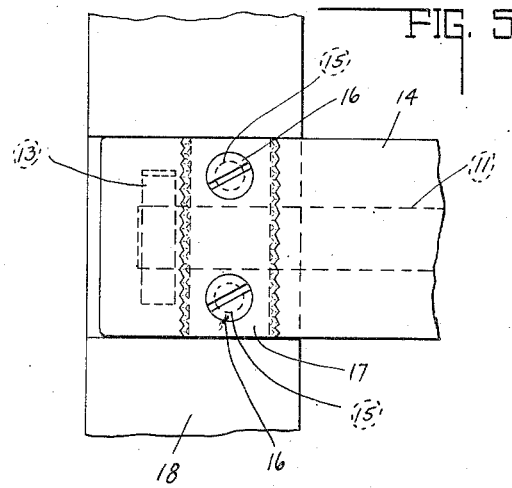 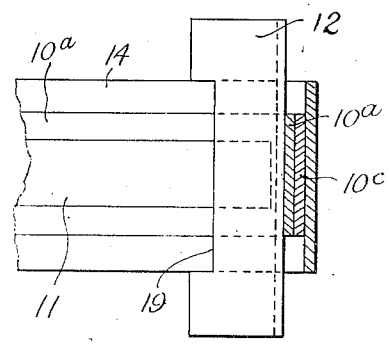
INVENTOR.
FLOYD K. EASTMAN.
BY
ATTORNEYS.

Patented Jan. 31, 1928.

1,657,528

UNITED STATES PATENT OFFICE.

FLOYD K. EASTMAN, OF KOKOMO, INDIANA, ASSIGNOR TO CONCEALED DOOR CHECK COMPANY, OF KOKOMO, INDIANA, A CORPORATION.

DOORCHECK STRAP.

Application filed September 28, 1926. Serial No. 138,236.

This invention pertains to a concealed door check particularly adapted for use in connection with automobile bodies or similar vehicles.

Heretofore varying types of checks have been used originating with the ordinary exposed loop strap which would loop outwardly from the door when in closed position and be secured at both ends to the surface of the door and body. Concealed checks have been employed wherein a cable or metallic member has been slidably secured within the frame work of the body and door so as to be entirely concealed when in closed position, as well as groove and slot checks mounted on the top of the door, such types requiring shock absorbing members and being relatively expensive of manufacture and installation.

The principal object of this invention is to provide a concealed check which will be little, if any more expensive than the ordinary strap; which will have sufficient resiliency and give to absorb the shock without provision of an additional shock absorbing member, and which will assume its proper position in the frame work of the door or body so as to avoid interference with the window actuating mechanism and take up a minimum of space, as disclosed in my prior applications, Serial Nos. 104,081, filed April 23, 1926, and 120,009, filed July 2, 1926.

The principal feature of the improvement claimed herein resides in the securing clip or baffle plate mounted in the fixed end of the strap so as to securely clip and hold the fabric against displacement or tearing when the strip is fastened in position upon the door and body of the vehicle. This greatly strengthens the fastening of the structure whereby it will stand hard usage and severe shocks when the door is violently swung open. This structure overcomes the difficulty experienced in having the strap pulled from its securing plate by undue strain to which it is subjected in the violent opening of the door.

A further feature of the invention resides in the arrangement and form of the enlarged head secured at the free end of the strap for engaging a suitable stop plate and limiting its sliding movement with respect to the vehicle door or body. The head as disclosed herein comprises a central recessed portion of less width than the projecting ends thereof, whereby the projecting ends are adapted to engage a stop plate or the like for limiting the movement of the strap. Inasmuch as the strap surrounds and embraces the intermediate narrow portion of the head, there will be a bulging of the strap as it passes thereabout. It would be damaging to the strap to permit the bulging portion thereof surrounding the head to come in contact with the opening thru which the strap passes, wherefore, the extreme and exposed ends of the head are provided with forwardly extending projections adapted to precede the enlarged portion of the strap and thus protect it against damaging contact.

The full nature of the invention will be understood from the accompanying drawings and the following description and claims.

Fig. 1 is a plan view of the strap with a portion of one end broken away. Fig. 2 is a section taken on the line 2—2 thereof. Fig. 3 is a section taken on the line 3—3 thereof. Fig. 4 is a perspective view of the clip. Fig. 5 shows one end of the strap fastened to the body. Fig. 6 is a section taken on the line 6—6 of Fig. 2.

In the drawings there is illustrated a door check strap particularly adaptable for use in connection with vehicle doors for limiting the opening movement thereof and absorbing the shock. Said strap comprises a plurality of fabric layers which may be designated as inner layers $10^a$ and $10^b$, and outer layers $10^c$ and $10^d$. Mounted between the inner layers $10^a$ and $10^b$ there is a metallic strip 11 of spring metal having one end inserted in and slidable with respect to an enlarged head 12.

As illustrated in Fig. 2 the inner layers of fabric are looped around the head 12 and have their free ends folded around the opposite end of the strip 11, one set of free ends being looped or folded over the other. The outer strips $10^c$ and $10^d$ are likewise looped about the head 12 and have their free ends extending around the looped ends of the strips $10^a$ and $10^b$.

A U-shaped clip or retaining member 13 is positioned about the looped ends of the inner fabric strips $10^a$ and $10^b$ so as to embrace also the adjacent end of the strip 11, the metal of the U-shaped clip being clamped in position about said looped ends so as to securely bind them in their looped formation about the end of the strip 11.

The fabric strips are enclosed within a covering of vulcanized rubber 14 so as to be completely housed and weather proof, whereas the concealed strap as a whole has the appearance of a solid rubber strap. For anchoring the ends of the strap rigidly in place there is provided suitable holes 15 which extend through the rubberized covering and the fabric strips on each side of the spring metal strip 11 adjacent of the clip 13. Said holes are adapted to receive suitable screws 16 for securing the anchor plate 17 to the door or body member 18. Whereas without the clip 13 or some suitable binding member, severe usage would cause the screws and anchor plate 17 to rip through the fabric. This weakness of the strap is accordingly avoided since the clip 13 will not only compress and reinforce the fabric but will act to prevent tearing thereof as well as present a reinforcement for the screws and anchor plate. Thus the strap is effectively prevented from pulling away from its anchor under severe strain.

As best shown in Figs. 1 and 6, the enlarged head 12 is provided with a recessed portion indicated at 19 about which the strap extends, said recessed portion leaving the exposed ends of the head projecting forwardly therefrom. As illustrated in Fig. 2, the strap surrounding the recessed portion 19 is caused to bulge laterally by reason of the thickness thereof, but the exposed ends of the head project forwardly therefrom so as to first engage any stop plate or the like and thereby protect the bulged portion of the strap from coming in contact therewith. This is essential to prevent undue wear of the strap at its enlargement, since it will be observed that, without the head being so recessed as to provide forwardly projecting exposed ends, the bulging or enlarged portion of the strap surrounding the head would directly contact with such stop plate or the like as may be provided. By means of this construction, the material of the strap may be fully protected from undue wear and the entire strain and wear produced by the engagement of the free end of the strap will be taken up by the metallic head 12.

The invention claimed is:

1. A check strap for limiting the opening movement of a door, comprising a flexible and resilient strap, and an enlarged head secured to one end of said strap and embraced thereby, said head being provided with forwardly extending exposed ends embracing the edges of said strap.

2. A check strap for limiting the opening movement of a door, comprising a flexible and resilient strap, and an enlarged head secured to one end of said strap and embraced thereby, said head being provided with a recessed portion intermediate its ends about which said strap extends, and forwardly extending end portions formed on said head protruding from and embracing opposite edges of the strap so as to extend forwardly of the enlarged portion thereof surrounding the intermediate recessed portion of said head.

3. A check strap for limiting the opening movement of a door, formed of flexible resilient material, an enlarged head secured to one end thereof about which said material is adapted to pass, said head causing said material to be expanded and enlarged as it passes thereabout, and means formed on said head and protruding from said material for protecting the enlarged portion thereof from damage and destruction in limiting the opening movement of the door.

In witness whereof, I have hereunto affixed my signature.

FLOYD K. EASTMAN.